United States Patent
Schwartz et al.

(10) Patent No.: US 11,443,124 B2
(45) Date of Patent: Sep. 13, 2022

(54) READING OF AN ELECTROMAGNETIC RESONANT STRUCTURE BY A SEPARATED TRANSMITTER AND RECEIVER

(71) Applicant: Palo Alto Research Center Incorporated, Palo Alto, CA (US)

(72) Inventors: David Eric Schwartz, Concord, MA (US); Farzad Inanlou, Redwood City, CA (US); Shabnam Ladan, Menlo Park, CA (US); Dogan Timucin, Santa Cruz, CA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 0 days.

(21) Appl. No.: 16/952,755

(22) Filed: Nov. 19, 2020

(65) Prior Publication Data
US 2022/0156471 A1    May 19, 2022

(51) Int. Cl.
*G06K 7/10*    (2006.01)

(52) U.S. Cl.
CPC ............................ *G06K 7/10148* (2013.01)

(58) Field of Classification Search
CPC ...... G06K 7/10148; G06K 7/086; G06K 7/10; G06K 7/10009; G06K 7/10376; G06K 7/10405; G06K 19/067; G06K 19/0672; G06K 19/0675; G06K 19/0723; G06K 19/0726; G08B 13/2437; G08B 13/2414; G08B 13/2431; H03C 7/00; H03C 7/02; H03C 7/022; H03C 7/025; H03C 7/027; H03C 7/04

USPC .............................................. 340/10.3, 572.5
See application file for complete search history.

(56) References Cited

U.S. PATENT DOCUMENTS

| | | | |
|---|---|---|---|
| 4,684,952 A * | 8/1987 | Munson | H01Q 21/065 342/368 |
| 5,410,314 A | 4/1995 | Frush et al. | |
| 5,945,938 A * | 8/1999 | Chia | H01Q 21/065 342/51 |
| 6,617,963 B1 * | 9/2003 | Watters | G01D 5/48 340/10.41 |
| 7,123,129 B1 * | 10/2006 | Schrott | G06K 19/0723 340/10.1 |
| 7,479,884 B1 * | 1/2009 | Fullerton | G01S 13/756 342/51 |
| 7,498,940 B2 | 3/2009 | Pettus | |
| 7,619,562 B2 | 11/2009 | Stumbo et al. | |

(Continued)

*Primary Examiner* — Edwin C Holloway, III
(74) *Attorney, Agent, or Firm* — Mueting Raasch Group (57) ABSTRACT

A resonant structure includes a conductive surface layer on a dielectric layer that produces an enhanced or reduced backscattered radiation in one or more resonant frequency bands when illuminated with electromagnetic energy. A transmitter illuminates the resonant structure with the electromagnetic energy at a first angle relative to the normal of the conductive surface. A receiver is operable to detect the enhanced or reduced backscattered radiation at the resonant frequency bands at a second angle relative to the normal of the conductive surface. The second angle is different from the first angle by at least five degrees. A processor coupled to the receiver and is operable to detect data encoded in one or both of a frequency response and a polarization response of the resonant structure based on the detected enhanced or reduced backscattered radiation.

17 Claims, 8 Drawing Sheets

(56) References Cited

U.S. PATENT DOCUMENTS

| | | | | |
|---|---|---|---|---|
| 2004/0159708 A1* | 8/2004 | Yogev | ............... | G06K 7/10009 235/492 |
| 2005/0110614 A1* | 5/2005 | Coates | ............... | G06K 19/0672 340/10.41 |
| 2005/0248438 A1* | 11/2005 | Hughes | .............. | G06K 19/0717 340/10.4 |
| 2005/0280539 A1* | 12/2005 | Pettus | .................. | G06K 19/067 340/572.1 |
| 2009/0014520 A1* | 1/2009 | Kofman | ................ | G06K 7/143 235/439 |
| 2010/0090802 A1* | 4/2010 | Nilsson | ............... | H01Q 1/2225 340/10.1 |
| 2018/0202928 A1* | 7/2018 | Abdulhalim | ......... | G01N 21/774 |
| 2020/0028272 A1* | 1/2020 | Green | ................. | H01Q 21/062 |
| 2020/0250387 A1* | 8/2020 | Hiraoka | ................ | H01Q 17/00 |
| 2020/0293848 A1* | 9/2020 | Mochizuki | ....... | G06K 19/07758 |

* cited by examiner

READING OF AN ELECTROMAGNETIC RESONANT STRUCTURE BY A SEPARATED TRANSMITTER AND RECEIVER

SUMMARY

The present disclosure relates to reading of an electromagnetic resonant structure by a separated transmitter and receiver. In one embodiment, a system includes a resonant structure with a conductive surface layer on a dielectric layer that produces an enhanced or reduced backscattered radiation in one or more resonant frequency bands when illuminated with electromagnetic energy. A transmitter of the system illuminates the resonant structure with the electromagnetic energy at a first angle relative to the normal of the conductive surface. A receiver of the system is operable to detect the enhanced or reduced backscattered radiation at the resonant frequency bands at a second angle relative to the normal of the conductive surface. The second angle is different from the first angle by at least five degrees. A processor of the system is coupled to the receiver and is operable to detect data encoded in one or both of a frequency response and a polarization response of the resonant structure based on the detected enhanced or reduced backscattered radiation.

In another embodiment, a method involves illuminating a resonant structure with electromagnetic energy at a first angle relative to a normal of a conductive surface layer of a resonant structure. The conductive surface layer is formed on a dielectric layer and produces backscattered radiation at a resonant frequency band in response to the illumination. Via a receiver, the backscattered radiation is detected at the resonant frequency band at a second angle relative to the normal of the conductive surface. The second angle is different from the first angle by at least five degrees. Data encoded in one or both of a frequency response and a polarization response of the resonant structure is detected based on the detected enhanced or reduced backscattered radiation.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure is generally related to passive radiofrequency (RF) devices. Some RF devices, such as RFID tags, are commonly used in applications such as product identification and tracking. An RFID tag typically includes an integrated circuit that is energized when illuminated by RF energy, the circuit transmitting a code in response, e.g., a sequence of encoded numbers. In contrast to RFID tags, the present disclosure relates to conductive structures that can encode and transmit information without requiring an integrated circuit. Instead, the geometry of a conductive material and its surrounding structure are designed to resonate when illuminated with a radiofrequency (RF) or millimeter-wave (mm-wave) (or higher frequency) electromagnetic (EM) energy such that the resonance(s) is (are) measurable as a signature in the spectrum of the radiation backscattered by the structure.

Such structures can be used to encode data, similar to RFID tags, or can be used as sensors, if the resonances are dependent on environmental or other variables. A challenge with these devices is that the magnitude, polarization, and, to some extent, frequency spectrum of the backscattered energy/radiation is dependent on the positions and orientations of the transmitter (TX) and receiver (RX) antennae or other sensing device relative to the encoded structure. In particular, if the source of the impinging EM field and the antenna or other receiving devices are co-located, the signal is typically maximized if they are positioned normal to the surface of the structure and decreases as the position deviates from that normal. At large angle deviations, the resonance is difficult to detect.

There are a couple of physical mechanisms responsible for this. Firstly, the received signal is a coherent superposition of two distinct electromagnetic waves: the specularly reflected field Eref, and the scattered field Esca. The former is due to the reflection of the incident wave by the flat substrate, and is prominent only in the direction dictated by the law of reflection from a planar surface. The latter is due to the current induced by the incident wave in the metal resonator that resides on the substrate. These two component waves differ markedly in their spectral and angular characteristics: Eref is typically broad in the frequency domain (as determined by the spectrum of the incident wave) but sharply peaked in the wavenumber (or solid-angle) domain, while Esca has a narrowband spectrum centered at the resonance frequency of the structure but a broad angular radiation pattern typical of a small scatterer. The total field that is detected by the receiver is a coherent superposition of these two waves, and the relative phases of the two waves change with changing TX and RX locations. The effect of adding these two complex-valued fields can manifest itself as a non-trivial change in the spectral line shape (Fano effect) and as well as the magnitude of the resonant signature.

The second mechanism is related to the nature of the induced current (the source of Esca) on the metal resonator. This current can also be thought of as a superposition of two separate contributions: the (ohmic) conduction current driven by $E_{tan}$ and the eddy current induced by $H_{nor}$, where $E_{tan}$ and $H_{nor}$ are the total tangential electric and normal magnetic fields on the metal surface, respectively. At normal incidence, $H_{nor}$ is zero and the current is purely ohmic. As the TX angle changes, two things happen. For transverse-electric (TE) incidence, $E_{tan}$ remains the same, whereas for transverse-magnetic (TM) incidence, $E_{tan}$ decreases with the cosine of the polar angle theta. Meanwhile, $H_{nor}$ becomes non-zero for TE incidence (while remaining zero for TM) and starts participating in the current induction process. Thus, the induced current is seen to depend on both the polarization and the incidence angle of the source. The individual surface current patterns that are induced by $E_{tan}$ and $H_{nor}$ can conspire to strengthen and/or weaken each other at different locations depending on the shape of the metal as well as the TX state (polarization, orientation, and distance relative to resonator), which in turn leads to non-trivial changes in the resonant signal spectrum and magnitude as seen by the RX.

While it is possible to design structures that backscatter radiation at oblique angles, it is difficult to achieve high signal strength and also independence from the circumferential (azimuthal) angle, which is desirable in most applications as it obviates the need for precise orientation control. For many applications, it is desired to locate the transceiver at a position that is not normal to the surface. This is mainly to achieve spatial imaging in the range direction. In the range direction, the ability to distinguish between objects, e.g., achieve range resolution, is by measuring the different round-trip times of flight of the signal to the different targets on the target plane and this involves receiving signals at an oblique angle. For example, to implement a synthetic aperture radar (SAR) or inverse SAR (ISAR) imaging algorithm to discriminate multiple resonant elements in a 2D pattern, the angle will be oblique. In general, enabling oblique angles extends the configurations in which a system can be implemented.

Figure 1:
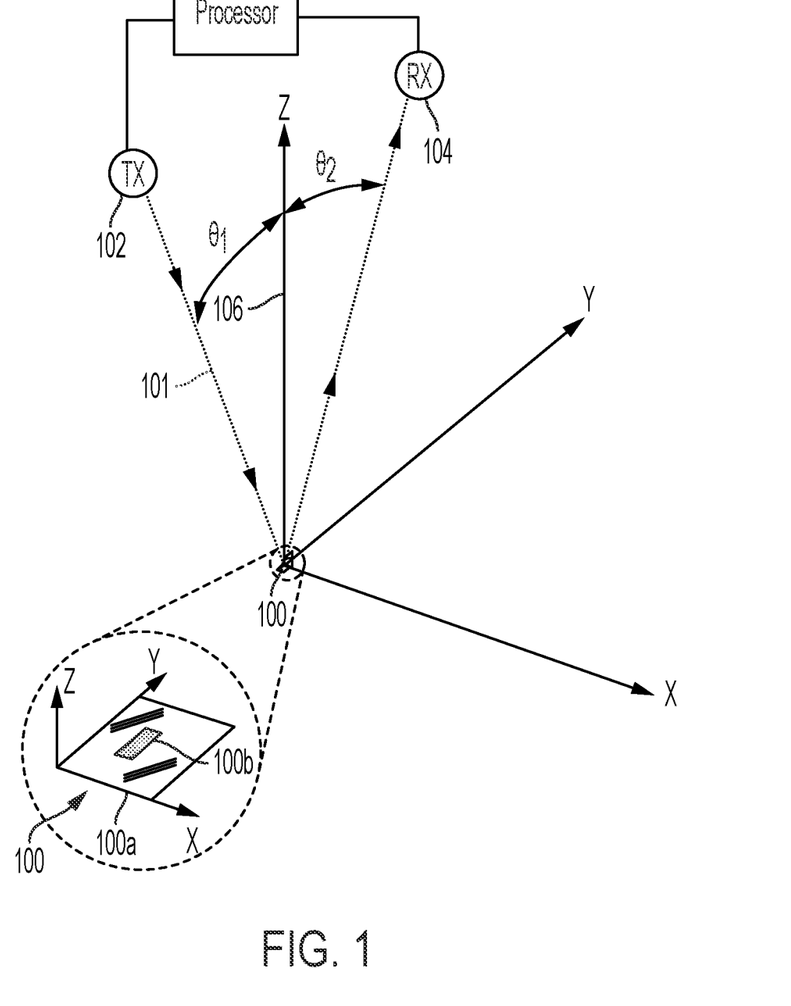
FIGS. 1 and 2 are diagrams of a system according to example embodiments.

In FIG. 1, a diagram shows a system according to an example embodiment. The system includes a resonant structure 100 comprising a conductive layer 100b on a dielectric layer 100a that produces an enhanced or reduced emission in one or more resonant frequency bands when illuminated with electromagnetic energy 101. A transmitter 102 illuminates the resonant structure 100 with the electromagnetic energy 101 at a first angle $\theta_1$ relative to a normal 106 of the conductive layer 100b. A receiver 104 is operable to detect the enhanced or reduced emission at the resonant frequency bands at a second angle $\theta_2$ relative to the normal 106 of the conductive layer. The second angle is $\theta_2$ different from the first angle $\theta_1$ by at least five degrees. Note that in this view the angles $\theta_2$ and $\theta_1$ are non-zero and oblique, but in another arrangement shown in FIG. 2, the receiver angle $\theta_2$ may be zero and the transmitter angle $\theta_1$ non-zero. Note that the value of $\theta_1$ may equal to the value of $\theta_2$, or their values may be different by some amount, e.g., $||\theta_1|-|\theta_2||/|\theta_1|<0.10$ or $||\theta_1|-|\theta_2||<10$ degrees. For example in some embodiment more than two receivers may be used, e.g., for different polarizations. Because they can't occupy the same space, they may be oriented at slightly different angles relative to the surface normal 106. In a more particular example, receiver A and receiver B may be located at $\theta_{2A}$ and $\theta_{2B}$, where $\theta_{2A} \neq \theta_{2B}$, and where at least one of the angles $\theta_{2A}$ and $\theta_{2B}$ is different in value from $\theta_1$.

Figure 2:
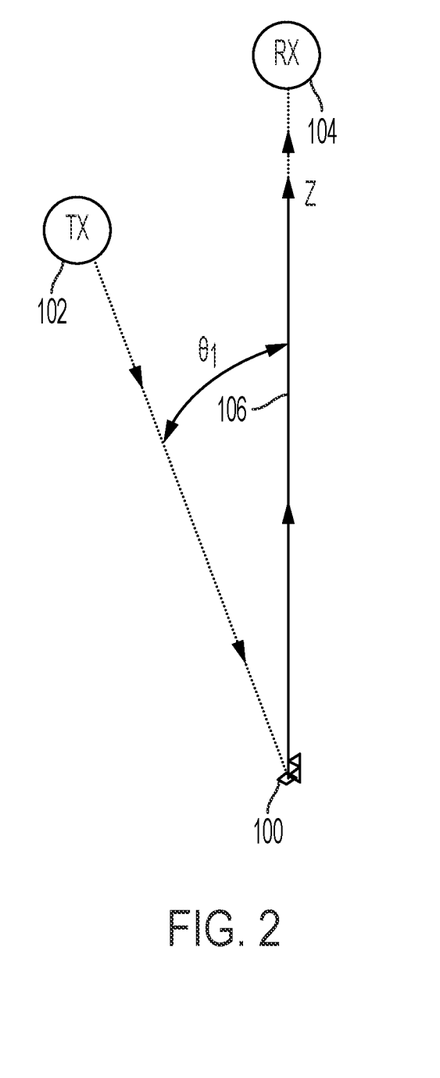

A processor is coupled to the receiver 104 and transmitter 102 and is operable to detect data encoded in one or both of a frequency response and a polarization response of the resonant structure 100 based on the detected enhanced or reduced emission. Using the separated transmitter 102 and receiver 104, the resonant conductive structure 100 can be interrogated with the source of electromagnetic energy oriented at an oblique angle. The receiver 104 may be an antenna or other device capable of receiving radio frequency (RF) or mm-wave energy. The receiver 104 is located either normal to the surface of the structure as shown in FIG. 2 or at an angle oriented opposite to the surface normal relative to the angle of the source, as shown in FIG. 1, e.g., at the same or different angle relative to the normal 106 in an opposing direction.

Figure 3:
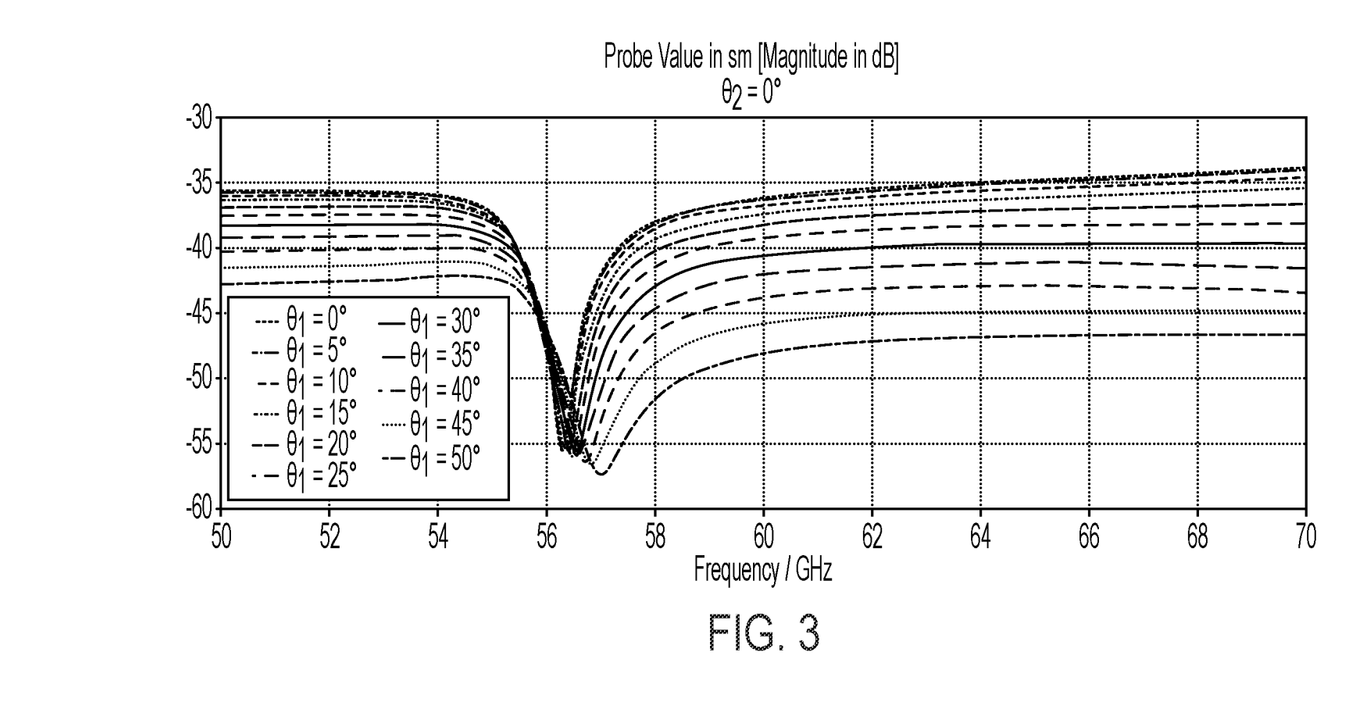
FIGS. 3 and 4 are graphs of simulations of systems according to an example embodiment.

In either of these cases, the resonance of the resonant structure 100 can be detected in the received signal. To demonstrate this concept, a single patch resonator was designed at a specific frequency. In this case example, the single patch resonates at 56 GHz but it can be at any frequency, e.g., 10 GHz to 100 GHz. The designed patch was simulated in the EM simulation tools, CST Studio Suite using frequency solver. In FIG. 3, a graph shows the backscattered signal from a patch resonating at 56 GHz for the case where the transmitter is at an oblique angle changing from normal to 50° and the receiver is normal to the patch. The resonance in the back scattered signal can be detected at the designed frequency with a small frequency shift when the transmitter has an offset more than 45°. Note that in this example, the patch exhibits a reduced emission around the resonant frequency band (e.g., around 55-59 GHz), but in other embodiments, the emissions could be enhanced, causing a peak near the resonant frequency band.

Figure 4:
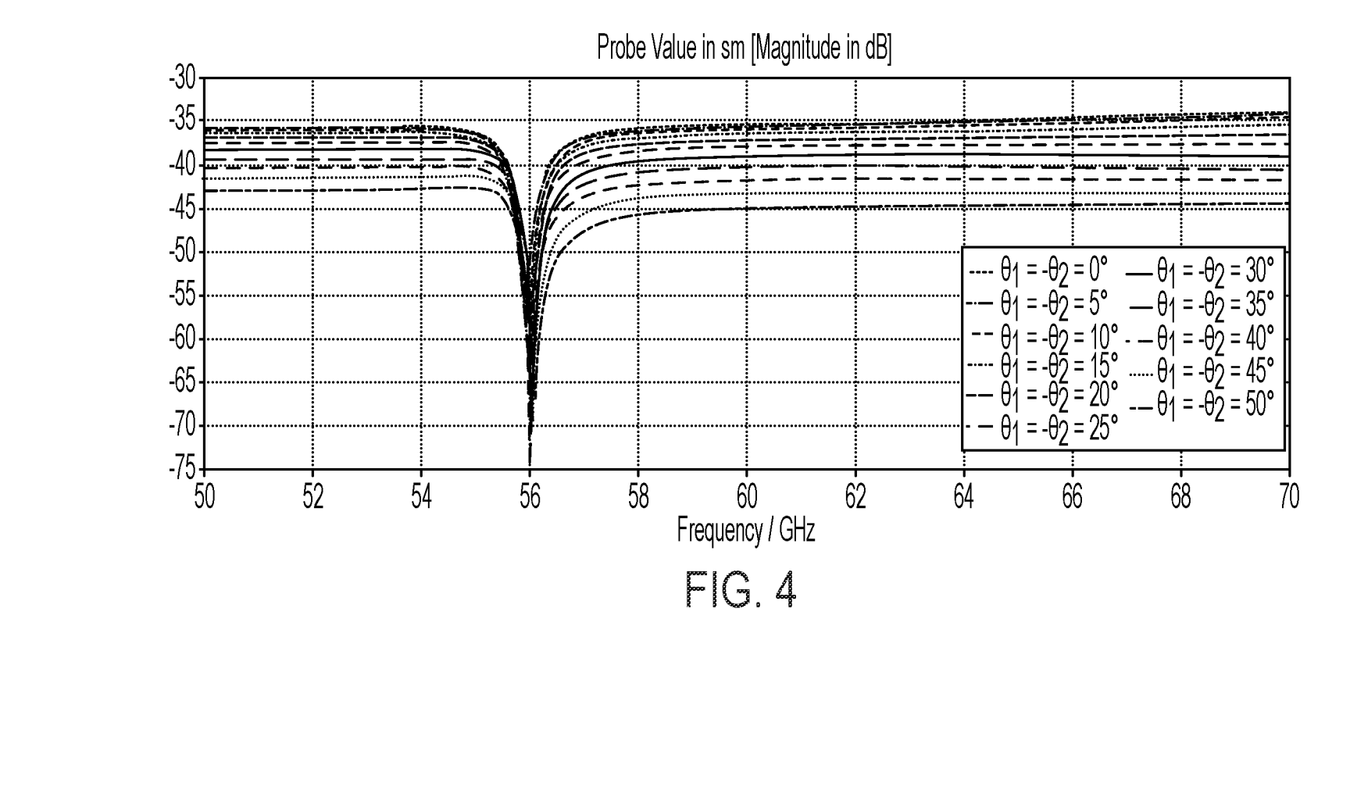

In FIG. 4, a graph shows the backscattered signal from a patch resonating at 56 GHz for the case that the transmitter is at an oblique angle $\theta_1$ changing from normal to 50° and the receiver is at an angle $\theta_2$ opposite to the angle of the transmitter (symmetric through the normal). In this case, the resonance frequency is detectable since there is energy reflected at the opposite angle (symmetric through the normal), which can be detected from a receiver positioned along the direction corresponding to the opposite angle. If the angles $\theta_2$ and $\theta_1$ were in opposite directions but have different values, then some frequency shift would be expected in proportion to the difference $|\theta_2-\theta_1|$. As with FIG. 3, the patch in this example exhibits a reduced emission around the resonant frequency band (e.g., around 55-57 GHz), but in other embodiments, the emissions could be enhanced, causing a peak near the resonant frequency band.

Separating the source and receiver as described above can enable ISAR-type algorithms to be adapted to resonant structures. In monostatic (conventional) ISAR, the ability to discriminate structures at different distances from the source is dependent on differences in the time-of-flight (TOF) of the RF energy traveling from the source to the structure and back. The more the angle of the source diverges from normal incidence, the larger the TOF difference is as a function of distance. With normally-incident radiation, the TOF is not appreciably different for structures near one another, so ISAR with co-located transmitter and receiver at a normal angle does not allow range discrimination. However, if only the receiver is normal to the surface and the source is at an oblique angle, there remains a difference in TOF to different structures. Similarly, if the receiver is at the opposite angle from the source, range discrimination is possible.

Achieving bistatic radar operation results in a less integrated system design. This can be a challenge especially at higher frequencies as the accuracy of the timing synchronization between the transmitter and receiver directly effects the spatial resolution of SAR and ISAR measurements. One way to overcome this challenge would be to have a coherent oscillator signal present at the receiver and transmitted in order to process the signal. For example, in frequency-modulated continuous-wave (FMCW) radar, the receiver collects the signal from the resonant device together with a synchronization signal from the transmitter. These signals are combined in a process known as deramping. The frequency of deramped signal is proportional to the bistatic range to the target less the baseline distance between the transmitter and the receiver. This synchronization of receiver and transmitter could be achieved through optical means.

Figure 5:
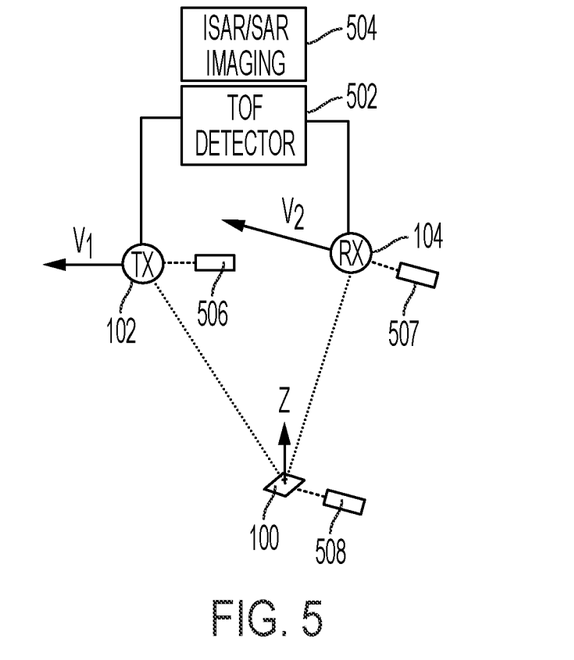
FIG. 5 is a diagram of a synthetic aperture radar system according to an example embodiment.

In FIG. 5, a diagram illustrates an example of an SAR or ISAR system, using the previously described resonant structure 100, transmitter 102, and receiver 104. In this example, one or both of the transmitter 102, and receiver 104 are shown in motion relative to the resonant structure 100. In this example, the transmitter 102 and receiver 104 are shown with velocity vectors $V_1$ and $V_2$ with different direction and magnitude, although these may be the same in some embodiments, e.g., where the transmitter 102 and receiver 104 are mounted to a common structure. Note that the term "relative" motion in this case also implies that the transmitter 102 and/or receiver 104 may be fixed, and the resonant structure 100 is moving relative to one or both the transmitter 102 and/or receiver 104. This motion can be induced by any combinations of actuators 506-508 that are coupled to one or more controllers/processors (not shown). Also note that while the relative velocity vectors $V_1$ and $V_2$ shown in FIG. 5 are linear, the same concept may apply to relative rotation of the transmitter 102 and/or receiver 104 with respect to the structure 100, with or without linear translation.

In one example implementation of an imaging system (ISAR), the conductive structures could be the targets that are on a moving platform such as a conveyor belt (or linearly moving platform). In another example (circular SAR), the conducting structure is a target that spins (ISAR) relative to TX and RX, or the scanner with TX and RX rotates around it. This latter case is an example of rotational relative movement.

A signal processing path is coupled to the transmitter 102 and/or receiver 104. The signal processing includes a TOF detector 502, which can be used to determine a location of the resonant structure 100 relative to the transmitter 102 and receiver 104. The TOF data can be used by an ISAR/SAR imaging module 504. In the case where the transmitter 102 and/or receiver 104 are moving and the resonant structure 100 is fixed, the imaging would be SAR. In the case where the transmitter 102 and receiver 104 are fixed and the resonant structure 100 is moving, the imaging would be ISAR. For purposes of this disclosure, the terms SAR and ISAR are considered interchangeable as far as the underlying physics is concerned, although the implementations (e.g., signal processing, mounting and movement of the various components) would be different.

Figure 6:
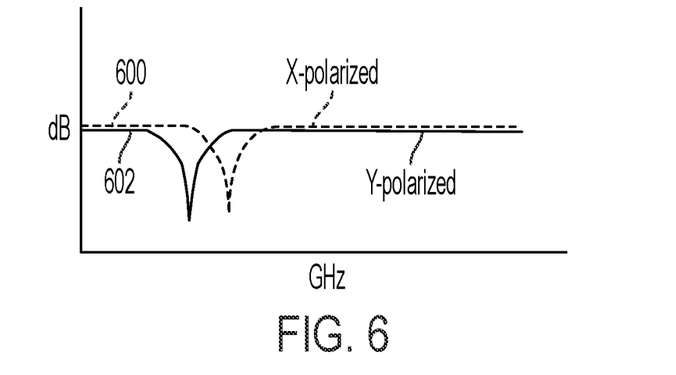
FIGS. 6 and 7 are graphs showing response plots of system according to additional embodiments.

In the previous examples shown in FIGS. 3 and 4, a signal magnitude was detected at the receiver without necessarily considering the polarization of the detected signal and/or the polarization response of the resonant structure. In some embodiments, data can be encoded in the resonant structure such that different resonances are present for different polarizations of radiation. An example of this is shown in FIG. 6 according to an example embodiment. In this example, the resonant structure is illuminated with a certain polarization ("X" polarization) and a measurement with that same polarization you would see a resonance as indicated by trace 600. Illuminating the resonant structure with a "Y" polarization (e.g., that is orthogonal to the "X" polarization), a different response is seen as indicated by trace 602. Note that the depiction of the polarization response in FIG. 6 is provided for purposes of illustration and not of limitation, and other responses may occur depending on the resonant structure and transmitter signal. For example, a resonant structure may have a strong response to x-polarized radiation and may have a weaker response (or none at all) to y-polarized radiation. In general, the shape of the peak or dip may also be different between the two polarizations. Also, the polarization responses may occur at or near the same frequency in some cases.

By having multiple receiver units with different polarizations (or a receiver that can switch polarizations) these two measurements can be made simultaneously or contemporaneously. This would involve illuminating the resonant device with separate or mixed X&Y polarization to excite both sets of resonances and measure each resonance response with the one or more receivers.

In the above example, the resonant structure included a conductive layer on a dielectric layer that produced enhanced or reduced backscatter emission/radiation in one or more resonant frequency bands when illuminated with electromagnetic energy. In some implementations, multiple resonating devices could be used. This may include the use of multiple resonant structures each with different backscatter responses, or a single resonant structure with multiple conductive layers, each having different characteristics, e.g., thickness, shape, material, separation from a ground plane, different thickness or materials of surrounding dielectric, etc. The multiple resonating device may also include a single structure with more complex features such that it has multiple resonance.

Figure 7:
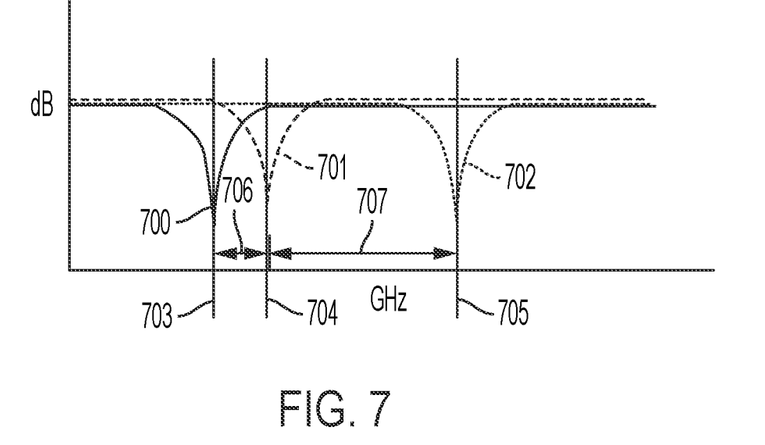

In FIG. 7, a diagram illustrates an example of receiver spectra for a set of resonators with three different resonant frequency bands. Each of traces 700-702 represent a response of a different resonant element, such as three resonant structures with individual conductive layers, one resonant element with three resonant layers/features, etc. The three resonant frequencies 703-705 may be used as center frequencies for bands that correspond to each resonant element. The detection of resonance in these bands may be used, e.g., to set a bit value to one in codeword. In other embodiments, the separation 706, 707 between the center frequencies may be used to define information. Note that using the frequency separation 706, 707 to encode data may only provide two values instead of the three values provided when using center frequencies, but may be less susceptible to errors due to frequency shifting, e.g., due to large transmitter angles where the receiver is normal to the resonant elements.

Figure 8:
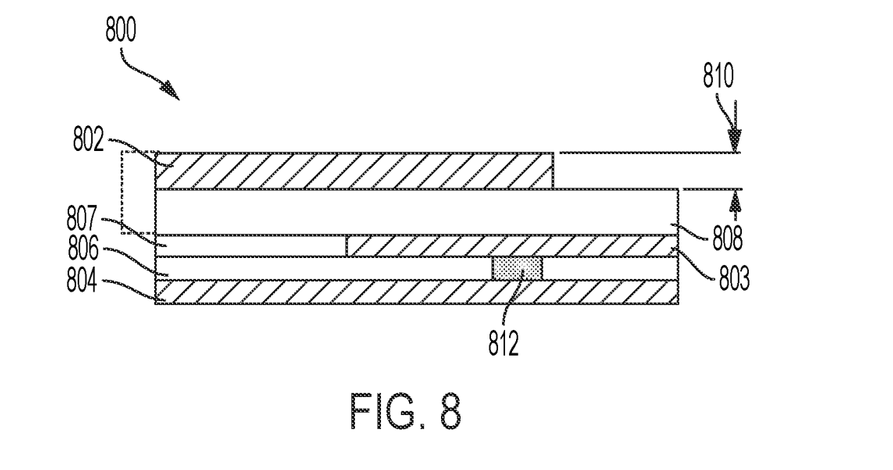
FIG. 8 is a cross-sectional view of a resonant structure according to an example embodiment.

In FIG. 8, a cross sectional view shows elements that may be used in a resonant structure 800 according to an example embodiment. The structure 800 includes conductive layers 802-804. Some of the conductive layers 802-804 may be configured as 2D (or 2.5D) conductive surfaces with features (e.g., shapes, materials, surrounding material structures) that cause resonance and backscattering in response to EM illumination. The conductive layers 802-804 may have other functions as well. For example, layers 802, 803 may be resonance structures and layer 804 may be a ground plane. Dielectric layers 806-808 separate the conductive layers 802-804.

The conductive layers may also have three-dimensional shape/features, as indicated by dashed lines on the left side of layer 802. This may be obtained by depositing the conductive layer 802 in this shape in a layer deposition process, or by folding over an exposed part of the conductive layer 802 that extends beyond the dielectric layer 808. In the latter case, the resonant structure 800 may be used in a printing process, in which conductive and/or semi-conductive layers are printed onto an insulation layer/dielectric.

The resonant structure 800 may include features that alter the response of the one or more conductive layers 802-803 in response to an environment of the resonant structure 800. For example, the response of the structure 800 (e.g., resonant frequency, amount that the response is enhanced/reduced, polarization response, etc.) may change in response to humidity, temperature, vibration, concentration of a specific gas, optical illumination, etc. One way that this may be accomplished is shown in FIG. 8, where feature 812 is included in the dielectric layer 806 that separates the conductive layer 803 from the ground plane 804. The feature 812 may contact both layers 803, 804 or be separated by some amount of dielectric 806. A characteristic of the feature 812 (e.g., conductivity, capacitance, etc.) may change in response to a selected environmental condition, thereby changing a response of the structure 800 that can be detected. Such a feature may be used with one conductive layer or multiple conductive layers.

Figure 9:
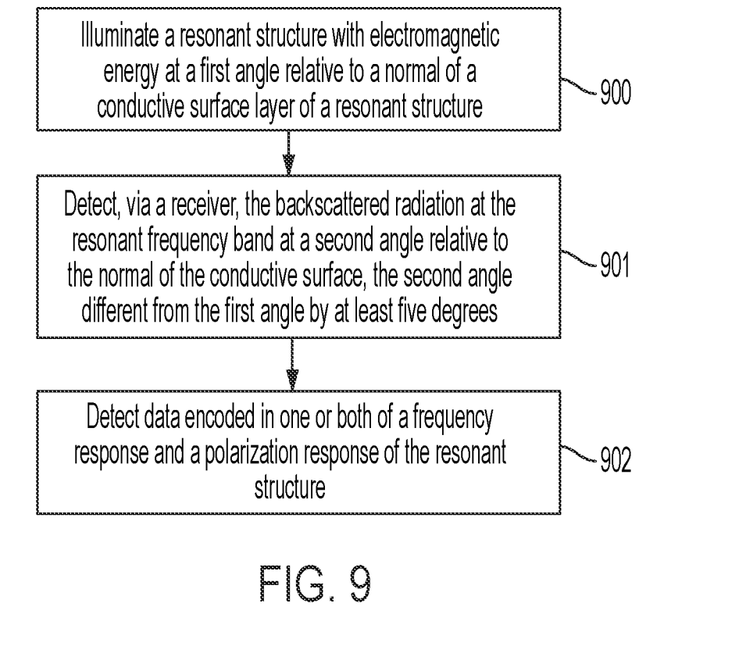
FIG. 9 is a flowchart of a method according to an example embodiment.

In FIG. 9, a flowchart shows a method according to another example embodiment. The method involves illuminating 900 a resonant structure with electromagnetic energy at a first angle relative to a normal of a conductive surface layer of a resonant structure. The conductive surface layer is formed on a dielectric layer and produces backscattered radiation at a resonant frequency band in response to the illumination. Via a receiver, the backscattered radiation is detected 901 at the resonant frequency band at a second angle relative to the normal of the two-dimensional conductive surface. For example, the second angle may be zero and the first angle non-zero, the angles may be non-zero and symmetric about the normal, etc. Data encoded in one or both of a frequency response and a polarization response of the resonant structure is detected 902 based on the detected enhanced or reduced backscattered radiation.

Figure 10:
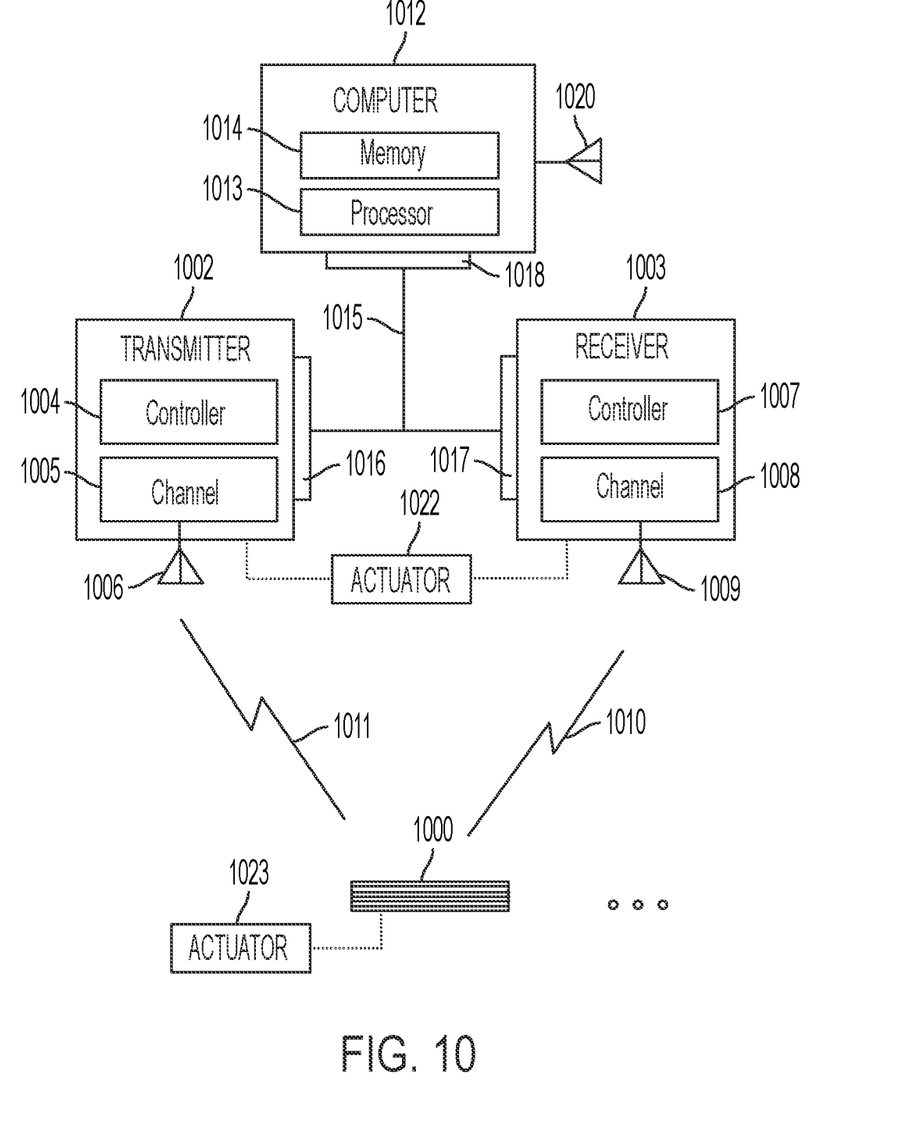
FIG. 10 is a block diagram of a system according to an example embodiment.

In FIG. 10, a block diagram illustrates a system according to an example embodiment. The system includes one or more resonant structures 1000 with a conductive surface layer on a dielectric layer. The resonant structure(s) 1000 produces an enhanced or reduced backscattered radiation 1010 in one or more resonant frequency bands when illuminated with electromagnetic energy 1011. A transmitter 1002 illuminates the resonant structure 1000 with the electromagnetic energy at a first angle relative to the normal of the conductive surface. The transmitter 1002 includes a controller 1004, a data transmission channel 1005, and an antenna 1006. These components 1004-1006 are used to generate and transmit the energy 1011, e.g., as a constant frequency signal, as a swept or stepped frequency signal, etc.

A receiver 1003 is operable to detect the enhanced or reduced backscattered radiation 1010 at the resonant frequency bands at a second angle relative to the normal of the conductive surface. The second angle is different from the first angle by at least five degrees. The receiver 1003 includes a controller 1007, a data transmission channel 1008, and an antenna 1009. These components 1007-1009 are used to receive and process the backscattered radiation 1010, e.g., amplify, filter, digitize, etc.

A computer 1012 has a processor 1013 coupled to the receiver 1003 and is operable to detect data encoded in one or both of a frequency response and a polarization response of the resonant structure 1000 based on the enhanced or reduced backscattered radiation 1010 detected by the receiver 1003. The computer 1012 is shown coupled to both the transmitter 1002 and receiver 1003 via data line 1015 and data interfaces 1016-1018, however other arrangements may be used. For example, the computer 1012 could be co-located with one of the transmitter 1002 and receiver 1003. Instead of or in addition to the data line 1015, the transmitter 1002, receiver 1003, and computer 1012 may communicate via antennas 1006, 1009, 1020. The computer 1012 includes memory 1014 that can be used to store instructions that are usable to cause the processor 1013 to perform the operations described herein.

The system may include one or more actuators 1022, 1023 to induce relative motion between the resonant structure 1000 and one or both of the transmitter 1002 and receiver 1003 while the resonant structure 1000 is illuminated and the backscattered radiation is detected. The processor 1013 may be further operable to determine one of an SAR and ISAR image based on the detected emissions 1010. In such an embodiment, the data line 1015 could include an electrical or optical signal line that provide synchronization information for purposes such as deramping backscatter emission signals.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

The invention claimed is:

1. A system comprising:
   a resonant structure comprising a conductive surface layer on a dielectric layer that produces an enhanced or reduced backscattered radiation in one or more resonant frequency bands when illuminated with electromagnetic energy;
   a transmitter illuminating the resonant structure with the electromagnetic energy at a first angle relative to a normal of the conductive surface layer;
   a receiver operable to detect the enhanced or reduced backscattered radiation at the resonant frequency bands at a second angle relative to the normal of the conductive surface layer, the second angle different from the first angle by at least five degrees; and
   a processor coupled to the receiver and operable to detect data encoded in one or both of a frequency response and a polarization response of the resonant structure based on the detected enhanced or reduced backscattered radiation, the data being encoded within the resonant structure, wherein the processor is coupled to the transmitter and further operable to synchronize the illumination with the backscattered radiation through an optical signal transmitted to the transmitter and the receiver, the optical signal combined with a detected backscattering radiation signal to synchronize the transmitter and the receiver via deramping.

2. The system of claim 1, wherein the first and second angles are non-zero and oblique relative to the normal of the conductive surface layer.

3. The system of claim 2, wherein the first and second angles are at a same angular separation in opposite directions from the normal of the conductive surface layer.

4. The system of claim 1, wherein the second angle is zero.

5. The system of claim 1, wherein the system includes an actuator to induce relative motion between the resonant structure and one or both of the transmitter and the receiver while the resonant structure is illuminated and the backscattered radiation is detected, the processor further operable to determine one of a synthetic aperture radar (SAR) and inverse SAR image based on the detection of the backscattered radiation.

6. The system of claim 1, wherein the frequency band of the resonant structure varies with an environment of the resonant structure, the processor further operable to measure the environment of the resonant structure based on the detected backscattered radiation.

7. The system of claim 6, wherein the environment comprises at least one of humidity, temperature, vibration, concentration of a specific gas, and optical illumination.

8. The system of claim 1, wherein the processor is further operable to detect the data based on two or more polarization responses of the resonant structure.

9. The system of claim 1, wherein the electromagnetic energy illuminates the resonant structure at a plurality of frequencies within a band that includes the resonant frequencies of the structure.

10. The system of claim 1, wherein the resonant frequency bands are between 10 and 100 GHz.

11. A method, comprising:
  illuminating a resonant structure with electromagnetic energy via a transmitter that is at a first angle relative to a normal of a conductive surface layer of the resonant structure, the conductive surface layer formed on a dielectric layer and producing backscattered radiation at a resonant frequency band in response to the illumination;
  detecting, via a receiver, the backscattered radiation at the resonant frequency band at a second angle relative to the normal of the conductive surface layer, the second angle different from the first angle by at least five degrees;
  detecting data encoded in one or both of a frequency response and a polarization response of the resonant structure based on an enhancement or reduction of the detected backscattered radiation, the data being encoded within the resonant structure; and
  synchronizing the illumination with the backscattered radiation through an optical signal transmitted to the transmitter and the receiver, the optical signal combined with a detected backscattering radiation signal to synchronize the transmitter and the receiver via deramping.

12. The method of claim 11, wherein the first and second angles are equal in magnitude, non-zero and oblique relative to the normal of the conductive surface layer.

13. The method of claim 11, wherein the second angle is zero.

14. The method of claim 11, further comprising:
  inducing relative motion between the resonant structure and one or both of the transmitter and the receiver while the resonant structure is illuminated and the backscattered radiation is detected; and
  determining one of a synthetic aperture radar (SAR) and inverse SAR image based on the detected backscattered radiation.

15. The method of claim 11, wherein the frequency band of the resonant structure varies with an environment of the resonant structure, the method further comprising measuring the environment of the resonant structure based on the detected backscattered radiation.

16. The method of claim 11, further comprising detecting the data based on two or more polarization responses of the resonant structure.

17. The method of claim 11, wherein the electromagnetic energy illuminates the resonant structure at a plurality of frequencies within a band that includes the resonant frequencies of the structure.

* * * * *